Patented Feb. 6, 1923.

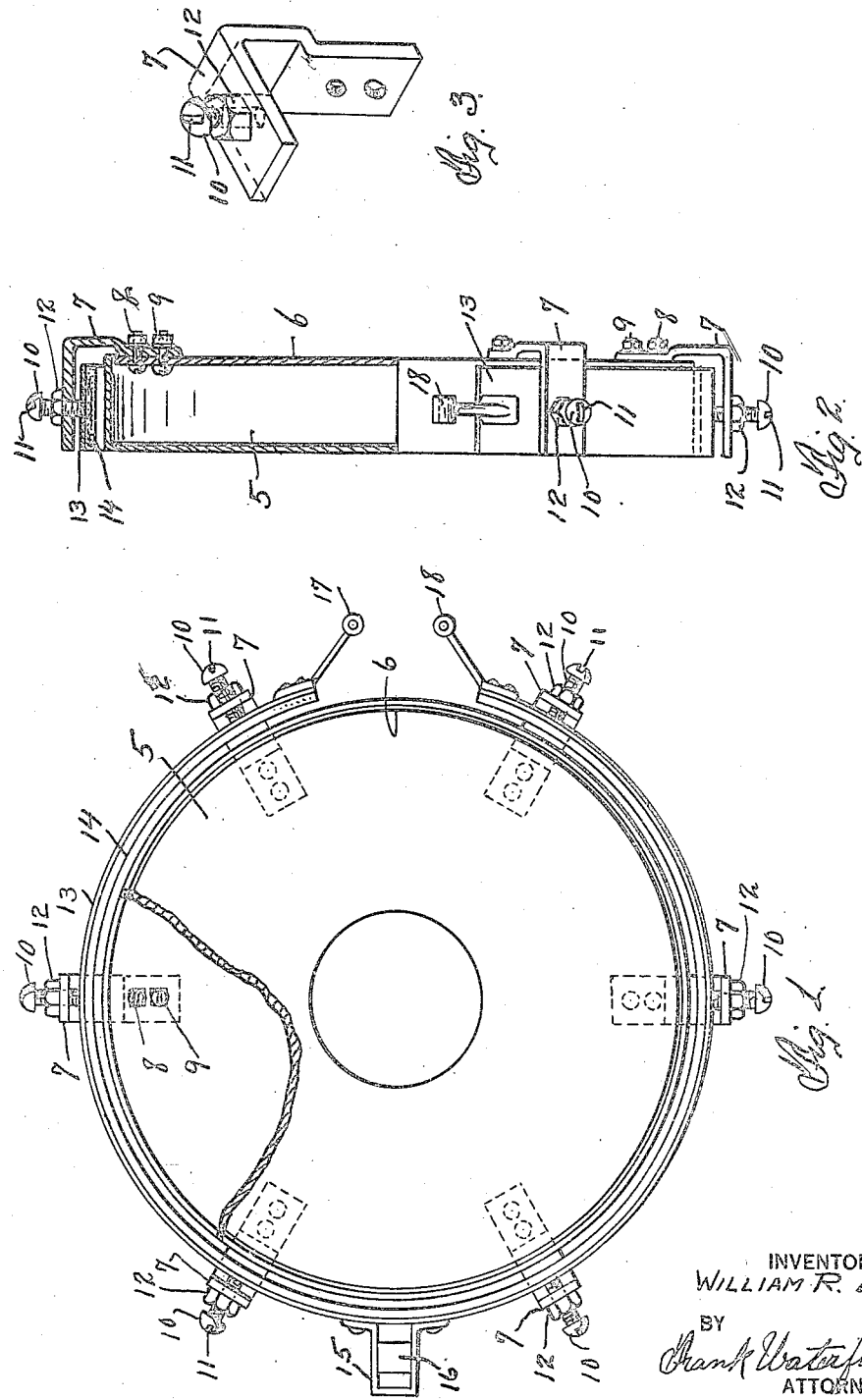

1,444,317

UNITED STATES PATENT OFFICE.

WILLIAM R. LEE, OF FRESNO, CALIFORNIA.

BRAKE.

Application filed April 11, 1921. Serial No. 460,357.

*To all whom it may concern:*

Be it known that I, WILLIAM R. LEE, a citizen of the United States, and resident of Fresno, in the county of Fresno and State of California, have invented new and useful Improvements in Brakes of which the following is a specification.

My invention relates primarily to a brake for use in auto vehicles, although it is not limited to such specific use.

Heretofore in the use of such brakes as are at present in use it has been the practice to form the brake band from flexible metal to which the usual brake lining is secured and the same held from contacting with the brake drum by various spring devices mounted at intervals around the dust shield to extend out over the brake drum and band and which act to pull the band away from the drum. In applying the brake it is necessary to overcome the tension of these springs and owing to the fact that it is practically impossible to tension the springs exactly alike and maintain them so, the brake band soon becomes "out of round", resulting in the brake lining contacting with the drum on a portion of its surface only, when in use, thereby reducing the effectiveness of the brake materially and causing the lining to wear out much more rapidly than would otherwise be the case. Another objectionable result is due to the fact that as the band is forced out of round the deformed portions of said band remain in contact with the drum, resulting in a great loss of power and making proper control of the vehicle difficult.

It is the object of my invention to provide a brake which will overcome the above mentioned objections and in which the necessity of springs and the like devices, to hold the band from contact with the drum when not in operation, is obviated.

A further object is to provide a brake in which the maximum braking efficiency may be obtained with a minimum effort.

Other objects and advantages will appear hereinafter and, while I have shown and will describe the preferred form of my invention, I wish it to be specifically understood that I do not limit myself to such preferred form but that various changes and adaptations may be made therein without departing from the spirit of my invention.

In the drawings accompanying and forming a part hereof:

Fig. 1 is a side elevation of a brake drum equipped with my device, looking from the inside of the wheel.

Fig. 2 is a right hand elevation of Fig. 1.

Fig. 3 is a perspective view of one of the adjusting brackets of my device.

Referring to the drawings, 5 indicates the brake drum of the usual or any desired construction; 6 is the dust shield, also of the usual construction. Secured at equally spaced intervals around the dust shield 6, to extend radially, are a plurality of substantially L-shaped brackets 7 by bolts 8. Bolts 8 are provided with a screw driver slot 9 in the head thereof. The short free ends of brackets 7 extend transversely of the brake drum 5, and mounted in these free ends, at a point about centrally of the width of drum 5, are round headed adjusting screws 10, provided with screw driver slots 11 and lock nuts 12, it being understood that screws 10 pass through brackets 7 in screw threaded engagement therewith. 13 indicates the brake band of my device which is formed preferably from spring steel, upon the inner side of which is mounted the brake lining 14 in the usual manner and has a stirrup or bracket 15 secured upon the outer periphery thereof centrally of its length, which stirrup is mounted to straddle stud 16 which provides anchorage for said brake band. The free ends of band 13 are provided with connecting members 17 and 18 by means of which the device is operated.

In the use of my device the band 13 will be bent to a circle of a diameter somewhat larger than the diameter of the drum 5. The adjusting screws 10 will then be adjusted to hold the band and lining spaced the required distance from the drum 5, the flexibility of the band 13 being such that the tendency thereof will be always expansive, the screws 10 merely acting as stops to hold the band the required distance from the brake drum. When the brake is operated the band and lining will be compressed to contact with the drum equally at all points on its circumference, and as the brake is opened by the brake lever in the usual manner the flexibility of the band will cause the same to immediately return to its position against the screws 10.

Having described my invention what I claim is:

1. A brake comprising a drum; a brake band surrounding the drum; a disc located within the drum concentric therewith but spaced therefrom; a plurality of equally spaced L-shaped brackets mounted upon the disc to extend radially thereof, the brackets having end portions which are disposed to extend transversely across the band and being provided with adjusting screws extending therethrough in screwthreaded engagement therewith adapted to bear against the outer periphery of said band; means to detachably secure said brackets in positions of use; and means to lock said adjusting screws in their adjusted positions.

2. A brake comprising a drum and a dust shield; a plurality of radially extending L-shaped brackets detachably mounted upon said dust shield, the shorter leg of which brackets projects transversely across the drum; a brake band surrounding said drum beneath said brackets; adjusting screws projecting through said shorter legs into contact with said band; means to lock said adjusting screws in their adjusted positions; and means to detachably secure said brackets in position for use.

WILLIAM R. LEE.